INTERTOLL DIAL SWITCHING AND SIGNALING SYSTEM

Filed Sept. 22, 1955 8 Sheets-Sheet 1

INVENTOR.
WILLIAM W. PHARIS
FERDINAND J. CAMPA
HERBERT M. BLINN
BY
[signature]
ATTORNEY May 3, 1960 W. W. PHARIS ET AL 2,935,571

INTERTOLL DIAL SWITCHING AND SIGNALING SYSTEM

Filed Sept. 22, 1955 8 Sheets-Sheet 3

INTERTOLL DIAL SWITCHING AND SIGNALING SYSTEM

Filed Sept. 22, 1955

SECOND SELECTOR 22

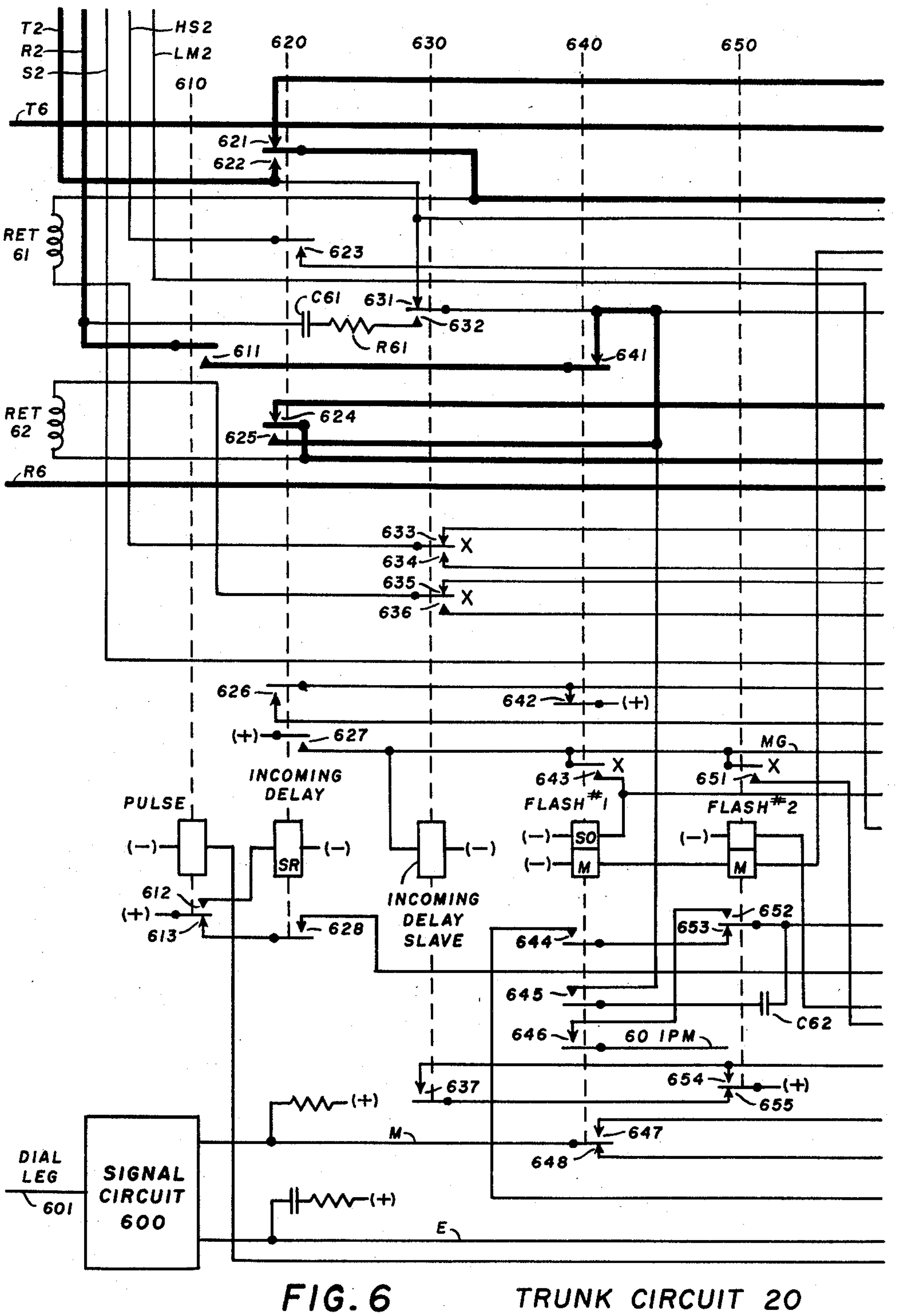
FIG. 6 TRUNK CIRCUIT 20

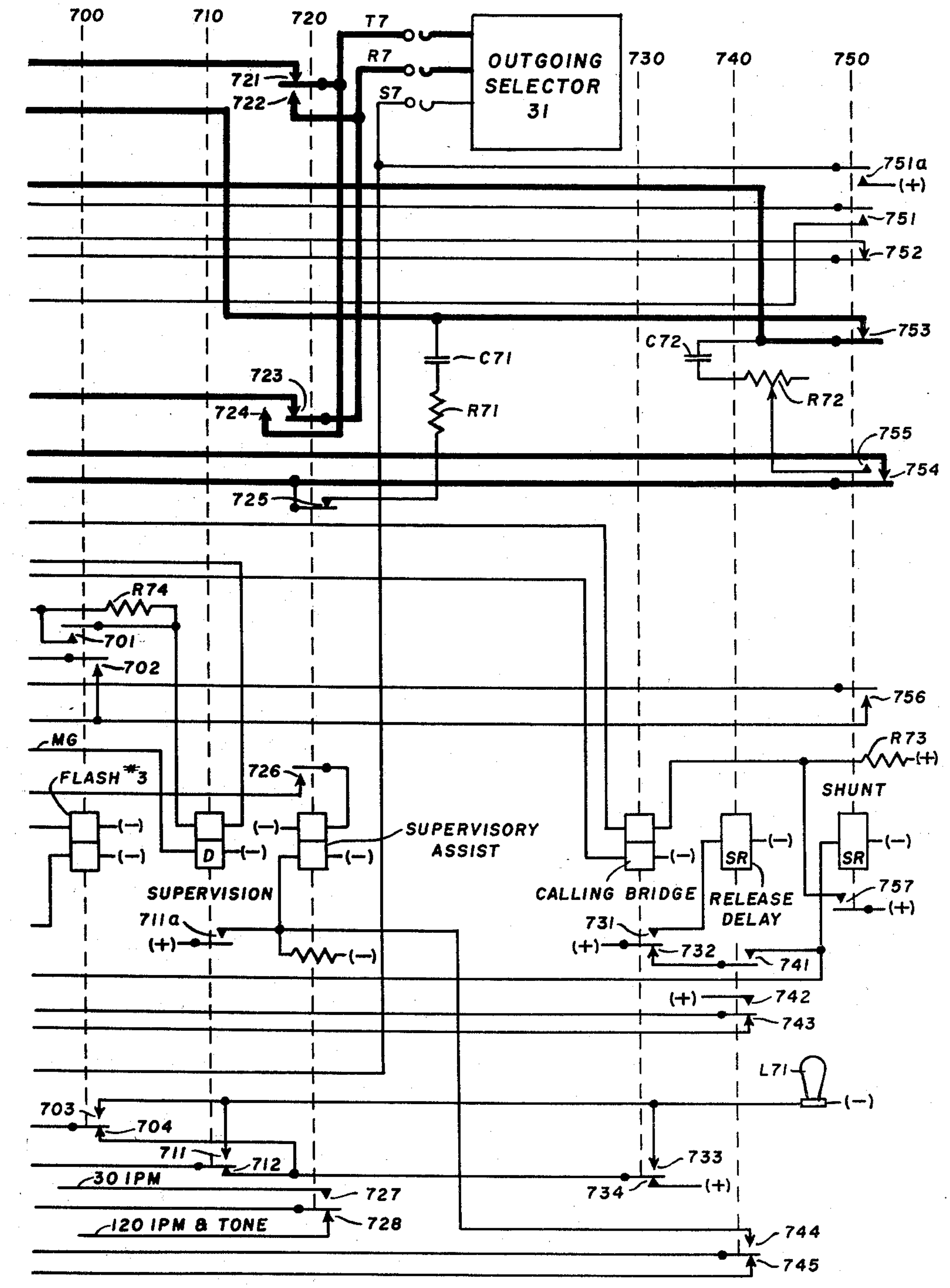
FIG. 7 TRUNK CIRCUIT 20

United States Patent Office 2,935,571

Patented May 3, 1960

2,935,571

INTERTOLL DIAL SWITCHING AND SIGNALING SYSTEM

William W. Pharis, Rochester, N.Y., Ferdinand J. Campa, Tampa, Fla., and Herbert M. Blinn, Chicago, Ill., assignors to General Dynamics Corporation, a corporation of Delaware Application September 22, 1955, Serial No. 535,832

15 Claims. (Cl. 179—18)

This invention relates to telephone systems and more particularly to intertoll dial switching and signaling systems.

The art of automatic telephony is developing toward the day when so-called long distance telephone calls will be completed by means of automatic switches only. These calls may be made without the intervention of any operators; or, there may be an operator at the calling end of the line, as required. Systems providing for such calls are known as "intertoll dial systems." The advent of these systems poses many new problems involving supervision which must be returned under many new and different types of conditions. For example, heretofore, local supervision has been extended only to an operator in the same exchange. The magnitude of the problem is increased because it is uneconomical to run special signaling conductors between intertoll offices. Hence, there is a need for new equipment which may return all necessary supervision over existing trunks, dial legs, signal circuits, and the like.

One of the problems which is encountered relates to various all-trunks-busy conditions. For example, a call may be extended through a tandem exchange. Certain equipment may be seized there for completing the call through that exchange on a tandem basis. This equipment has access to other equipment on a distributed or percentage basis. For example, there may be any number of outgoing trunk circuits. These may be broken into smaller groups each of which is accessible to one bank of switches. To illustrate, the first ten circuits may be accessible to a first group of incoming selectors, and another group of ten trunk circuits may be accessible to a second group of incoming selectors. Thus, switching equipment may complete the call to a point where it encounters an all-equipment or all-trunks-busy condition. This does not necessarily mean that there is not other idle equipment in the office. For example, in the illustration given above, the call may have been extended over the first group of incoming selectors at a time when the only idle trunk circuits were in the other group of ten trunk circuits. Therefore, it is possible that if the call is disconnected and redialed immediately, access may be had to the second group of incoming selectors. This call will then seize an idle trunk circuit which is not available to complete the present call.

Consider still another type of call that encounters an all-busy condition. It is possible that not only the particular equipment to which the call has access but all other similar equipment in the office is then busy. In this case, it would be futile to try to dial again before there is idle equipment. Hence, a second type of busy signal is required.

Still another condition may exist where it is necessary for a certain portion of the switching equipment over which the call has been extended to provide unique features, such as pad control, special signaling circuits, low resistance loops, and the like, for example.

Yet another type of supervision which may be required relates to flash recall. In this case, an operator has established a telephonic communication path; then, for some reason, it is necessary to resummon her so that she may provide additional services.

It would be helpful if a telephone system were arranged wherein these and other signals might be transmitted over existing trunk lines, dial legs, signal circuits, and the like.

A first object of this invention is to provide new and improved tandem switching.

Another object of this invention is to provide intertoll dial switching and supervisory signaling circuits.

Another object of this invention is to provide means for returning all intertoll dial supervision signals over existing switch circuits.

Still another object of this invention is to utilize fourth wire control circuits between switches for returning supervision.

A further object of this invention is to return flashing signals at different pulse rates for extending supervision to a distant exchange.

A still further object of this invention is to provide signaling and supervision which is equally useful to a calling operator and a calling intertoll subscriber.

These and other objects are accomplished by means of a special fourth wire control and various marginal relays. Different value resistances may be included in the fourth wire for controlling these marginal relays. More particularly, the call may be extended in a tandem exchange through a trunk circuit and several selectors to seize an outgoing trunk circuit. Each selector comprises a suitable stepping switch. Hence, if all of the trunk circuits accessible to the last selector are busy, the switch associated with the particular selector will be driven into an overflow position at the extremity of its switch motion. At this point the switch brushes are resting on an eleventh or overflow set of terminals. If this set of terminals is marked by one potential, reverse battery supervision is returned over the talking conductors together with a marking of one resistance over the fourth wire. On the other hand, if the eleventh terminal is marked by another potential, or absence of potential, reverse battery supervision is not returned over the talking conductors, but the same resistance marking is returned over the fourth wire. In either case, the resistance is effective to operate a marginal relay. This causes either of two distinctive flashing signals to be returned to the calling exchange. The selection between the two flashing signals is made by the presence or absence of reverse battery supervision. In this manner, a person at the originating exchange is able to distinguish between calls which encounter an all-trunks-busy condition and calls wherein only the trunk circuits accessible to a particular switch train are all-busy. In the latter case, the call will be dialed again immediately to seize other switching equipment which may have access to idle apparatus.

The switch train may also encounter certain level markings which are sufficient to return a different resistance potential over the fourth wire circuit. This causes a still different operation of the marginal relays. The trunk circuit is now prepared for certain unique circuit operations, such as the completion of a special low resistance loop, for example.

On still another occasion, direct ground supervision may be returned over the fourth wire conductor without any resistance marking. This causes still another supervisory signal to be returned to the distant exchange. One example of a signal of this type is the ordinary called line busy signal.

It is thought that the means for accomplishing these and other objects will be obvious to those skilled in the art from a description of the attached drawings, in which:

Figs. 6 and 7 show details of a two-way trunk circuit which is shown in Fig. 1 by heavily inked rectangle 20;

Figures 5, 8:
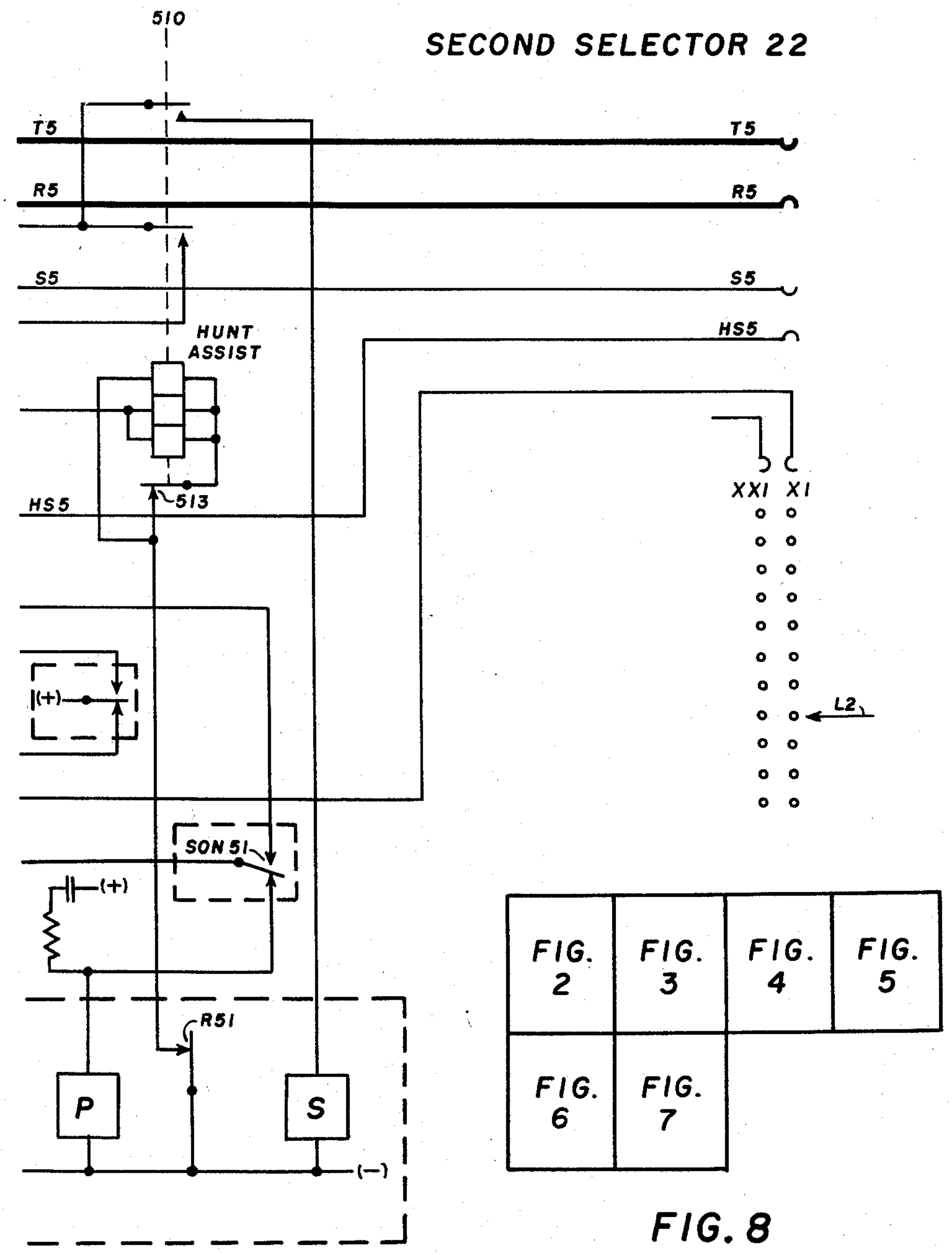
Figure 9:
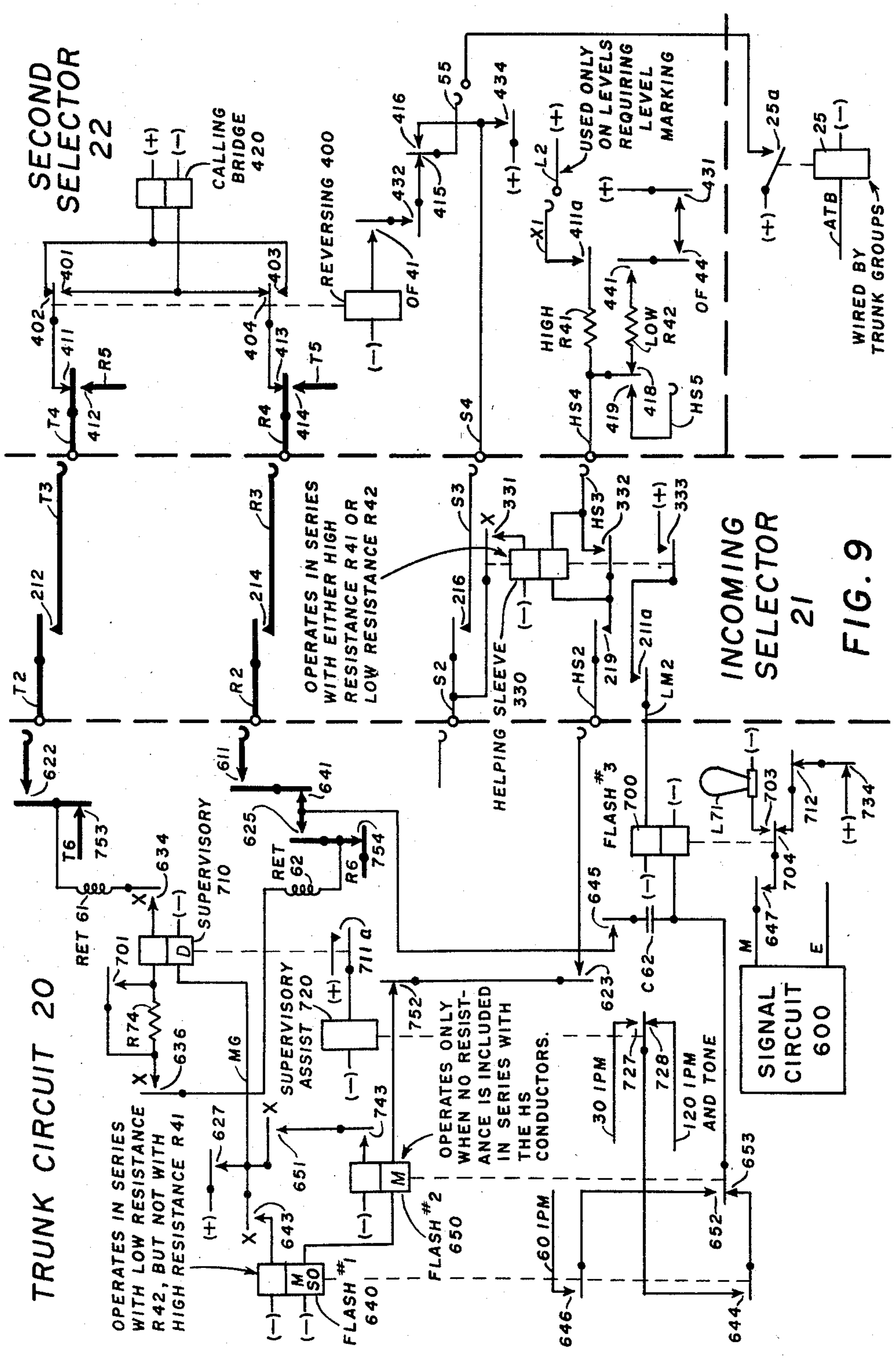

Fig. 8 shows the manner in which Figs. 2–7 should be arranged to provide a complete and understandable circuit; and Fig. 9 shows a portion of the circuit which is shown in detail in Figs. 2–7. Elements in Fig. 9 have the same reference numerals as similar elements in Figs. 2–7. Fig. 9 is a greatly simplified showing which has been prepared to facilitate explanation and understanding of the invention.

In the drawings, simple (+) and (−) signs have been used to designate the source of office potential. As is the case in most telephone circuits, the positive or (+) potential has been described as connected with ground; hence, the terms "(−) battery" and " ground (+)" have been used. It should be understood that either this or any other suitable power source could be used.

*Brief description*

Figure 1:
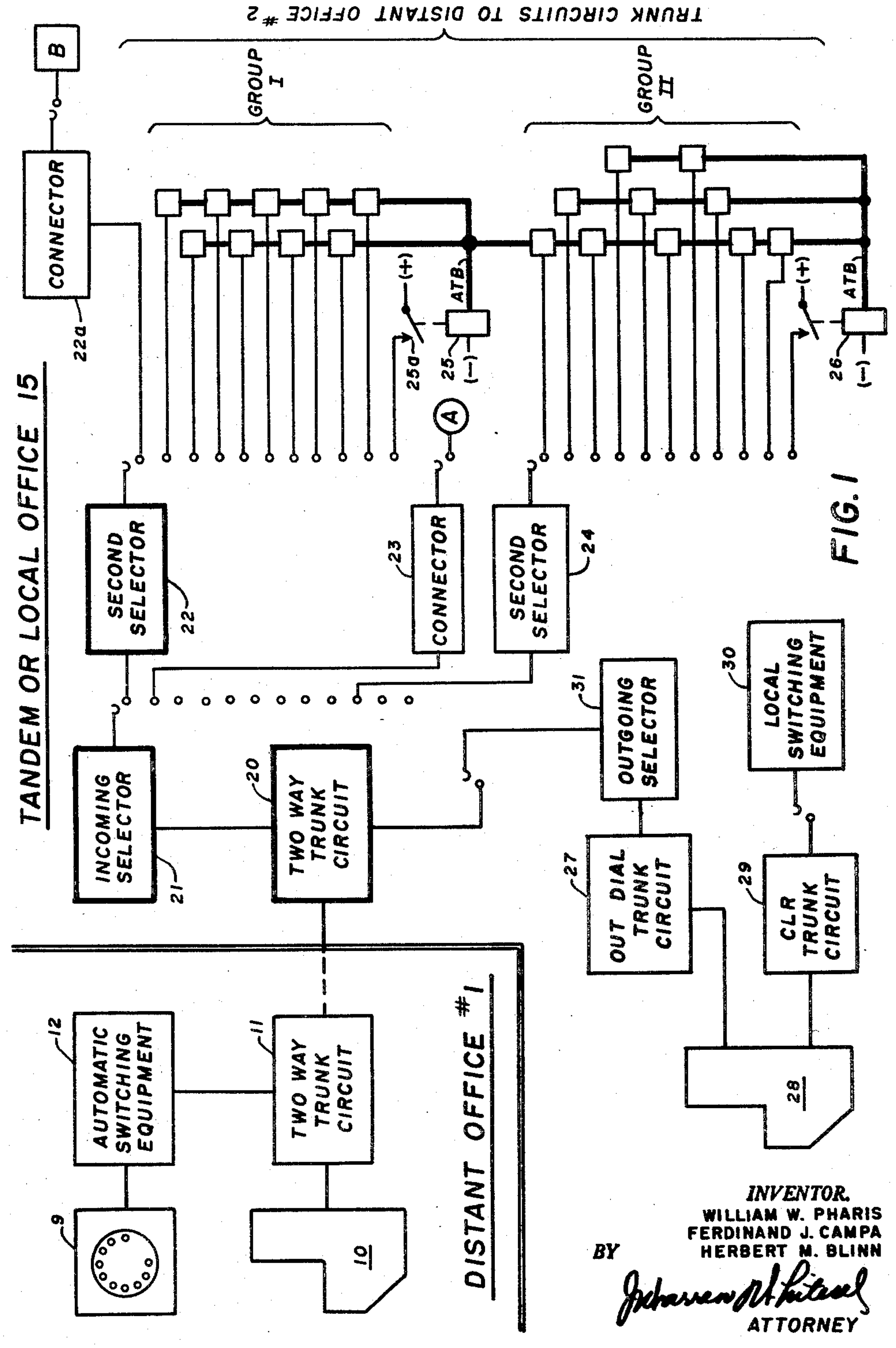
Fig. 1 shows by block diagram a typical intertoll dialing system including the present invention.
Figure 2:
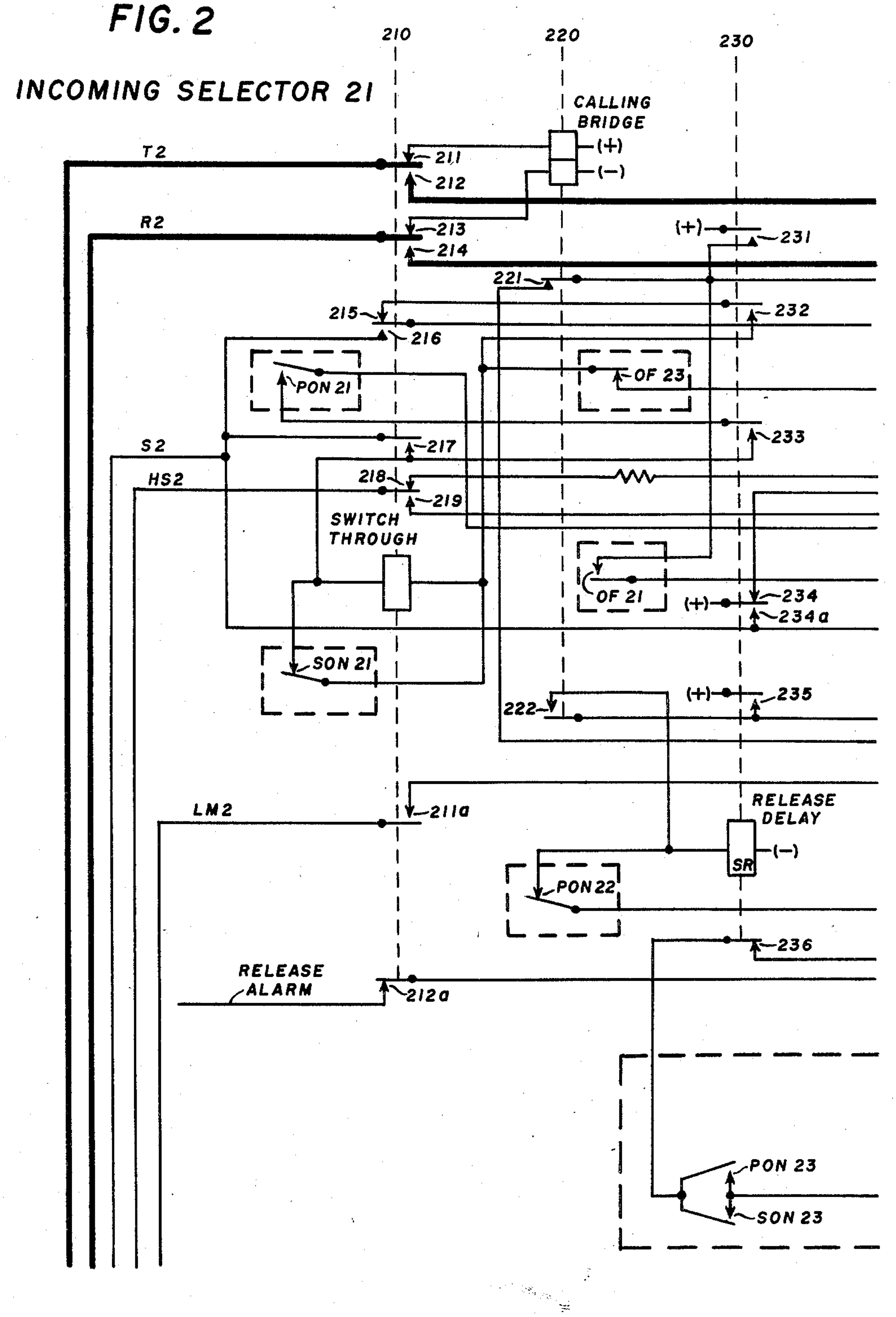
Figs. 2–5 show details of two selectors which may be used in the intertoll network. These are shown in Fig. 1 by means of heavily inked rectangles 21 and 22.
Figure 3:
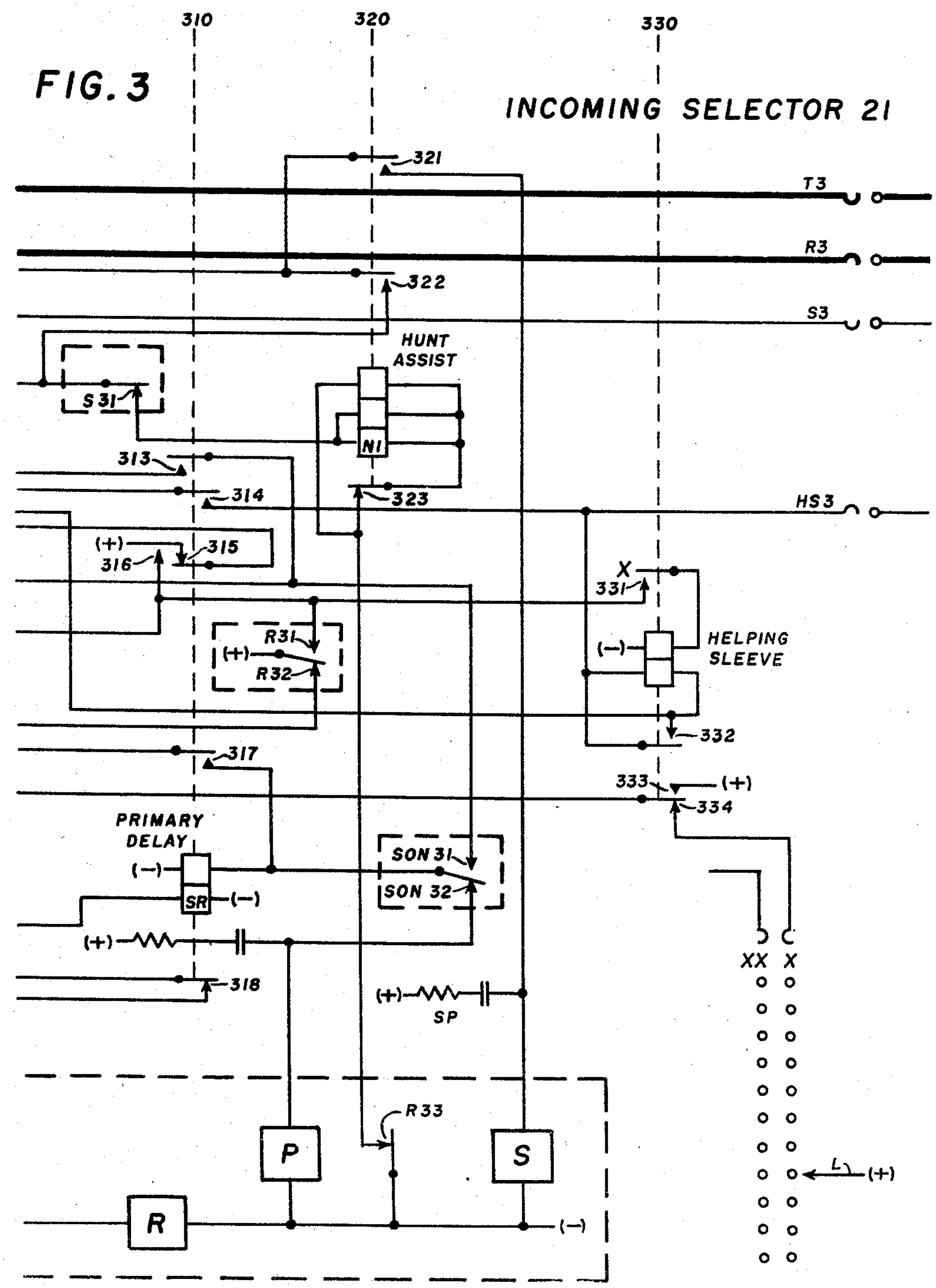
Figure 4:
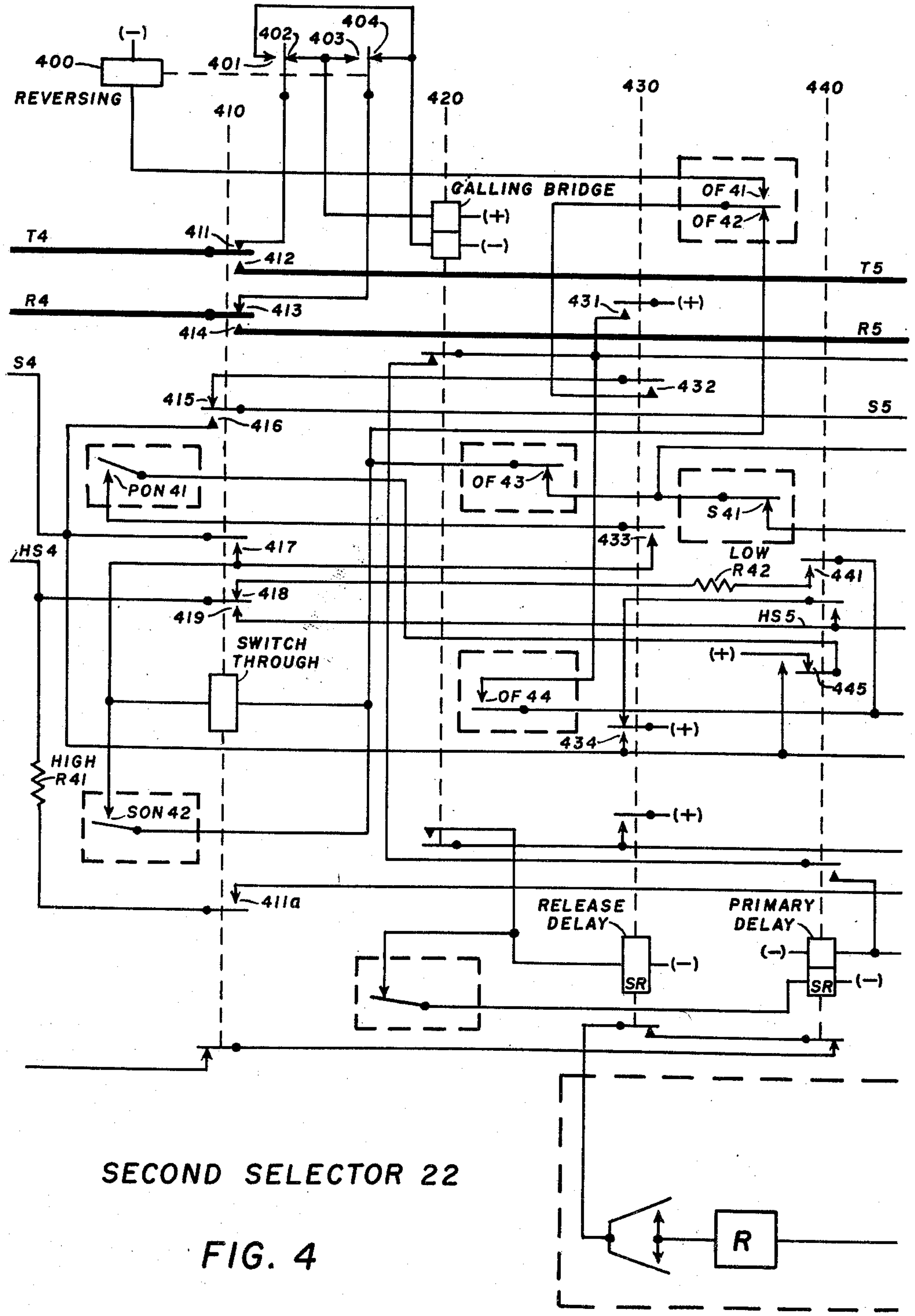

Referring first to Fig. 1, a telephone call may be completed by any suitable means from distant office #1 to tandem or local office 15. This call may be under the control of either operator 10 or intertoll dialing subscriber 9. For purposes of description, the call is described hereinafter as having originated at operator position 10. In this case, a subscriber (not shown) in distant office #1 calls the operator at position 10. Then, the operator at position 10 may dial through tandem office 15 to seize a called subscriber line in a distant office. This call is made directly and without the intervention of any other operator at the called end. She uses two-way trunk circuit 11, two-way trunk circuit 20, incoming selector 21, second selector 22 or 24 depending upon which idle equipment incoming selector 21 might seize, and any one of the trunk circuits to distant office #2. If the call is for the local office, i.e., there is no tandem operation, the operator may use either connector 23 or connector **22*a*** (as required to complete the call directly to a called subscriber.

Two conditions could exist on a tandem call. First, the operator may seize second selector 22 which has access to trunk circuits in group I. All of these trunk circuits may be busy. Perhaps there is an idle trunk circuit available in group II at this time. In this case, the operator may re-establish a call through second selector 24 and the idle trunk circuit in group II. In this case, all-trunks-busy relays 25 and 26 remain in an operated condition due to a ground (+) marking applied to conductor ATB by the idle circuit. The eleventh step overflow terminal is not marked by ground (+); hence, two-way trunk circuit 20 returns flashing signals at one rate of speed. This informs the operator at position 10 of the condition that exists. If all trunk circuits to distant office #2 are busy, relays 25 and 26 are released so that the eleventh step overflow terminal is marked by a ground (+) as at contacts **25*a*, for example. In this case, a signal which is flashing at a different rate of speed is returned by two-way trunk circuit 20 to the operator at position 10**.

If second selector 22 encounters certain special equipment, such as connector **22*a*, for example, a signal is returned to two-way trunk circuit 20. Two-way trunk circuit 20** uses this special signal to provide for some unique feature.

In the event that second selector 22 completes a call through one of its associated trunk circuits to distant office #2, it is possible that a recall signal may be transmitted from that distant office back through selectors 22 and 21. In this case, two-way trunk circuit 20 functions to return signals which are flashing at still a different rate of speed to summon the operator.

*Detailed description*

The first call to be described is one which is incoming from operator position 10 over trunk conductors T6 and R6 (Fig. 6) to two-way trunk circuit 20. This call is destined for a subscriber in distant office #2. That subscriber may be reached by way of trunk circuit 20, shown in detail in Figs. 6 and 7, incoming selector 21, shown in Figs. 2 and 3, and by way of second selector 22, which is shown in detail in Figs. 4 and 5.

*Seizure.*—When the call is placed the operator at position 10 performs suitable functions for causing signal circuit 600 to mark conductor E with a ground marking (not shown). Responsive thereto, incoming pulse relay 610 is operated over contacts 745. This relay is provided to seize the equipment in the local office and to receive and repeat switch directing signals which may be transmitted from operator position 10. Contacts 612 close thereby operating incoming delay relay 620. Contacts 611 close to prepare a circuit for operating calling bridge relay 220 in the incoming selector.

Incoming delay relay 620 is provided to furnish master ground for trunk circuit 20, to control certain release features, and further to extend the talking conductors. Contacts 622 and 625 close to extend the talking conductors T6 and R6 to conductors T2 and R2. The circuit now extends from (−) battery, through the lower winding of calling bridge relay 220 (Fig. 2), rest contacts 213, conductor R2, operated contacts 611, rest contacts 641, operated contacts 625 and rest contacts 754 to conductor R6. The tip side of the line may be traced from ground (+), through the upward winding of calling bridge relay 220, rest contacts 211, conductor T2, operated contacts 622, rest contacts 753 and conductor T6. As will be explained presently, calling bridge relay 220 operates over this circuit to seize incoming selector 21. A circuit which is effective later during the call for controlling a flash signal is completed at contacts 623. This circuit extends from conductor HS2, to contacts 623, 752, the lower winding of flash relays 650 and 640 to (−) battery. Contacts 626 have no effect at this time. Contacts 627 close to apply master ground to conductor MG. This ground is used for holding many of the trunk circuit relays in an operated condition. When this ground is removed these relays are released, hence, the name "master ground." When contacts 627 close, incoming delay slave relay 630 is operated. A circuit is also completed when contacts 627 close to energize the lower winding of supervisory relay 710, thereby biasing it for differential operation. This relay is arranged so that it will not operate when energized over the lower winding alone, but if it is already operated it will hold when energized over the lower winding alone. It does not operate at this time. Contacts 628 prepare a control path for shunt relay 750.

Incoming delay slave relay 630 is provided to lighten the contact load on relay 620. Contacts 631 have no function at this time. Contacts 637 close to mark the trunk circuit busy to outgoing selector 31. This circuit may be traced from ground (+), through rest contacts 655, operated contacts 637, and conductor S7 to outgoing selector 31. Contacts 634 and 636 close to prepare a circuit through the upper winding of supervisory relay 710.

Calling bridge relay 220 is operated when incoming pulse relay 610 and incoming delay relay 620 operate. The purpose of relay 220 is to seize incoming selector 21, to respond to and repeat digit pulses and to control the incoming selector until the call is completed through it to the next circuit. The circuit for operating this relay extends from (−) battery, through rest contacts 213, conductor R2, operated contacts 611, rest contacts 641, operated contacts 625, rest contacts 754, conductor R6, a direct current loop to conductor T6 (not shown), rest contacts 753, operated contacts 622, conductor T2, rest contacts 211, the upper winding of calling bridge relay 220 to ground (+). Contacts 222 close responsive to the operation of relay 220 to operate release delay relay 230 over a circuit which may be traced from (−) battery, through the winding of relay 230, operated contacts 222 and resting release magnet interrupter contacts R32 to ground (+).

Release delay relay 230 operates to hold incoming selector 21 during digit pulsing and to control its release after the call is completed. Contacts 231 close to apply the master ground to which various relays will be operated and locked. Contacts 232 close to prepare a path for causing the switch to hunt out in its secondary motion. Contacts 233 have no effect at this time. Contacts 234*a* close to return ground over conductor S2 to the trunk circuit. Contacts 236 open to prevent any possible release of the switch at this time.

Primary delay relay 310 operates over the circuit extending from (−) battery, through its lower winding, resting primary off-normal contacts PON22, operated contacts 222 and 235 to ground (+) and in parallel therewith contacts R32. The purpose of relay 310 is to mark the end of digit pulse trains. Contacts 313 close to prepare a circuit to conductor HS2; however, this circuit is ineffective at this time since overflow contacts OF21 and secondary off-normal contacts SON31 are now open. Contacts 314 close to prepare a circuit for extending ground (+) over conductor HS3 to the second selector 22. Contacts 316 close to apply an alternate ground to conductor S2. Contacts 317 close to prepare for control of primary delay relay 310 by calling bridge relay 220 during the receipt of digit pulses. Contacts 318 open a point in the circuit to release magnet F for controlling the release of the switch at a later time. Nothing further happens until the operator dials.

*Digit pulses in trunk circuit 20.*—A suitable number of digit pulses are transmitted over dial leg 601 to control the primary motion of incoming selector 21. Each incoming digit pulse is effective to cause equipment not shown in signal circuit 600 to repeat an open pulse over conductor E. That is, normally, ground is extended over conductor E during a call to hold incoming pulse relay 610 operated. Each time that a digit pulse is received from distant office #1, the ground is removed so that pulse relay 610 restores. Responsive thereto, contacts 612 open to deenergize incoming delay relay 620; however, it does not restore throughout digit pulsing due to its slow release characteristics.

Contacts 613 close to complete a circuit for operating shunt relay 750 over the circuit from (−) battery, through the winding of relay 750, operated contacts 628, rest contacts 613 and ground (+). Contacts 751*a* close to apply ground (+) to sleeve S7 to guard against seizure from outgoing selector 31. Shunt relay 750 places a direct metallic connection across the tip and ring conductors to improve pulsing characteristics. This circuit may be traced from conductor T2, through operated contacts 751, rest contacts 641, pulsing contacts 611 and conductor R2. Formerly, the circuit extended through the inductance of the retard coil and the winding of relay 715. This circuit might be traced from conductor T2, contacts 622, upper winding RET61 of the retard coil, operated contacts 634, the upper winding of supervisory relay 710, operated contacts 636, lower winding RET62 of the retard coil, operated contacts 625, rest contacts 641, and operated pulsing contacts 611 to conductor R2.

Contacts 752 open to disconnect flash relays 640 and 650 from helping sleeve conductor HS2. Contacts 753 and 754 open to break the talking conductors. Contacts 755, 756 and 757 have no use at this time and would otherwise cause pulse distortion.

*Digit control to selector 21.*—Returning to the receipt of the first digit pulse, as it releases incoming pulse relay 610 contacts 611 open. This causes calling bridge relay 220 to restore. It might be recalled that formerly it was holding over a loop which includes the heavily inked conductors.

Release delay relay 230 is deenergized each time that contacts 222 open; however, it does not release during the receipt of a digit pulse train due to its slow release characteristics. Contacts 221 close to complete a circuit for stepping the switch in its primary direction and for controlling primary delay relay 310. In greater detail, the circuit for stepping the switch extends from (−) battery, through the winding of primary magnet P, resting secondary off-normal contacts SON32, operated contacts 317, rest contacts 221 and operated contacts 231 to ground (+).

The switch takes a first step in its primary direction. Responsive thereto, the various primary off-normal contacts, marked by the letters "PON," operate. That is, contacts PON23 close to prepare the switch for release. Contacts PON22 open to break the original energizing circuit through the lower winding of primary delay relay 310 which thereafter is held operated depending upon its slow release characteristics and upon periodic energization over the circuit through pulsing contacts 221. This circuit may be traced from (−) battery, through the upper winding of primary delay relay 310, operated contacts 317, rest contacts 221 and operated contacts 231 to ground (+). Contacts PON21 close to prepare a circuit for switchthrough relay 210. The switch continues to step one step for each digit pulse that is received from the operator at position 10. After the last digit pulse has been received and the switch has been directed in its primary motion, contacts 221 remain open long enough for primary delay relay 310 to release thus marking the end of the first digit pulse train.

Now, the switch proceeds to hunt in its secondary direction for idle equipment. The extent of the hunting motion depends upon whether the circuits are idle or busy. The first step in the secondary direction is taken when hunt assist relay 320 operates secondary magnet S. In greater detail, a circuit may be traced from (−) battery, through release magnet interrupter contacts R33, rest contacts 323, the center winding of hunt assist relay 320, resting secondary interrupter contacts S31, resting overflow contacts OF23, resting secondary off-normal contacts SON21, operated contacts 233, operated primary off-normal contacts PON21, and rest contacts 315 to ground (+). Hunt assist relay 320 operates and closes its contacts 321, thus causing secondary magnet S to operate. This drives the switch one step in its secondary direction. The circuit for this extends from (−) battery, through the winding of secondary magnet S, operated contacts 321 and 231 to ground (+). When magnet S operates, it drives the switch one step forward in its secondary direction. Near the end of the drive secondary interrupter contacts marked by the letter "S" open. Thus, the circuit to hunt assist relay 320 is broken at secondary magnet interrupter contacts S31 to cause relay 320 to restore. This in turn opens contacts 321 to release secondary magnet S.

*Busy test.*—The next circuit function depends upon whether the first terminals are idle or busy. If they are busy a circuit is completed for driving the switch another step; however, if they are idle the switch stops and the circuit switches through. In greater detail, if the circuit is busy, ground (+) is encountered by brush S3. This marking is extended over a circuit through rest contacts 215, operated contacts 232, the winding of switchthrough relay 210, operated contacts 233, operated primary off-normal contacts PON21, and rest contacts 315 to ground (+). It should be observed that both terminals of switchthrough relay 210 are now connected to ground; therefore, it is shunted and does not operate. This is an indication that the line is busy and that the switch should take another step. Therefore, hunt assist relay 320 is operated over a circuit which may be traced from (−) battery, through release magnet interrupter contacts R33, rest contacts 323, the center winding of hunt assist relay 320, resting secondary magnet interrupter contacts S31, overflow contacts OF23, operated contacts 232, rest contacts 215, conductor S3 and the busy ground. Hunt assist relay 320 operates and closes its contacts 322 thereby connecting an alternate ground which may be traced from the left of the center winding of relay 320, through rest contacts S31, 322 and 231 to master ground (+). Thus, hunt assist relay 320 is held operated independently of the busy ground which is lost as soon as the switch steps-off of the busy sleeve terminal. Contacts 321 close to complete a circuit for energizing the secondary stepping magnet. This circuit may be traced from (−) battery, through the winding of secondary stepping magnet S, operated contacts 321 and 231 to ground (+). The switch takes another step in its secondary direction. Responsive thereto, secondary magnet interrupter contacts S31 open thus breaking the circuit through hunt assist relay 320 causing it to release. If ground is encountered by wiper S3, this cycle of operations is repeated and the switch takes still more steps either to the end of its bank or until an idle line is found.

*Idle line.*—Assuming that the switch finds an idle line there will be an absence of ground marking on conductor S3. Hence, there is no ground for reoperating hunt assist relay 320. It does not reoperate. The switch does not take another step in its secondary direction. Switchthrough relay 210 operates over a circuit which may be traced from (−) battery, through release magnet interrupter contacts R33, rest contacts 323, the center winding of hunt assist relay 320, secondary interrupter contacts S31, overflow contacts OF23, the winding of switchthrough relay 210, operated contacts 233, operated primary off-normal contacts PON21 and rest contacts 315 to ground (+). The circuit values are such that hunt assist relay 320 will not operate in this circuit but that switchthrough relay 210 will operate.

Switchthrough relay 210 operates and opens contacts 211 and 213 thereby releasing calling bridge relay 220. Contacts 212 and 214 close to switch the talking conductors through to second selector 22. Contacts 215 open to break the circuit to hunt assist relay 320. Contacts 216 close to interconnect sleeve conductors S2 and S3. Contacts 217 close so that switchthrough relay 210 is locked to sleeve conductor S2 independently of its original operating circuit. Contacts **211*a* close to extend a level marking over conductor LM2 if such level marking is present in the form of wiring L connected to bank X. Contacts 212*a*** open still another point in the switch release circuit.

Calling bridge relay 220 restores when contacts 211 and 213 open. This in turn opens contacts 222 to restore release delay relay 230. Of all of the relays that are shown in incoming selector 21, only switchthrough relay 210 remains operated. The circuits have now functioned to extend the connection from operator position 10 to second selector 22.

*Second selector 22.*—Incoming selector 21 and second selector 22 are substantially the same except for certain minor changes which are necessary to insure proper operation and to explain the invention. Therefore, the detailed explanation of stepping the switch, busy test, and the like, will be omitted from the explanation of second selector 22. Only those features which are unique to the invention will be explained.

In this connection, Fig. 9 shows a portion of the circuit shown in detail in the remaining drawings. This portion is partly in detached contact form and is partly in associated or attached contact form. If a relay and its contacts are associated, the association is shown by dashed lines. On the other hand, if no dashed lines are shown there is no relation between the contacts and nearby relays. In this case, reference should be made to the other drawings for detailed information. Fig. 9 is highly simplified so that perhaps portions of the following description may be easier to follow if reference is made to Fig. 9 instead of the detailed drawings.

Calling bridge relay 420 operates when the circuit is seized. Its energizing circuit being from ground (+), through the upper winding of relay 420, rest contacts 402, 411, conductors T4, T3, operated contacts 212, conductor T2, operated contacts 622, retard coil RET61, operated contacts 634, the upper winding of relay 710, resistor R74, contacts 636, retard coil RET62, contacts 625, 641, 611, conductor R2, contacts 214, conductors R3 and R4, contacts 413, 404 and the lower winding of relay 420 to (−) battery. When calling bridge relay 420 operates, a circuit is completed to operate relay 430 and in turn relay 440. Each of these relays releases at the end of the first digit pulse train.

The switch hunts out to find an idle trunk circuit to distant office #2 (Fig. 1) in the manner explained above in connection with incoming selector 22. Four things may occur. First, selector 22 may find an idle trunk circuit in which case switchthrough follows in the manner explained above in connection with incoming selector 21. Second, the switch could find that all trunk circuits to which it has access are busy but that there are idle trunk circuits some place in the telephone exchange. These circuits may be reached by another second selector similar to selector 22. Third, the switch could find that all trunk circuits leading to distant office #2 are busy; that is not just the trunk circuits to which second selector 22 has access but also the circuits to which selector 24 and other similar selectors have access. Fourth, the selector could encounter a special level which requires unique circuit treatment. For example, referring to Fig. 1, if second selector 22 should seize the level to which connector **22*a* is connected, a signal would be returned to trunk circuit 20 indicating that a special circuit operation is necessary. For example, perhaps connector 22*a* may require a loop having a resistance which is different from that required for selectors 21 and 22. In a similar manner, connector 22*a*** could be directed to levels which require different types of switching signals, pad control, or the like. For example, one level could require pulsing digit control, and another level could require frequency digit control, or some sort of a marker control. In any event, it would be necessary to return a level marking signal to the trunk circuit. These circuit operations will be explained in the order in which they were set forth above.

*Selector 22 has access to an idle line.*—If an idle line is found there is an absence of ground on conductor S5. This absence of ground unshunts switchthrough relay 410 so that it operates. The circuit for this function may be traced from (−) battery, through release magnet interrupter contacts R51, contacts 513, the center winding of hunt assist relay 510, secondary magnet interrupter contacts S41, overflow contacts OF43, the winding of switchthrough relay 410, contacts 433, contacts PON41 and contacts 445 to ground (+). In this case, contacts 412 and 414 close. The talking conductors are switched through to distant office #2. There is no problem if this is the case.

Eventually reverse battery answer supervision is returned to operate differential relay 710. Contacts 711 and 712 switch conductor M from ground (+) to (−) battery. Contacts **711*a* operate supervisory assist relay 720. This in turn opens contacts 725** to remove idle line termination C71 and R71.

*All trunks to which second selector 22 has access are busy.*—In this case, second selector 22 searches for an idle trunk. None are available to it, but another second selector switch in the same office does have access to an idle trunk. Referring to Fig. 1, it is seen that this is the case where the all-trunks-busy conductor ATB has a ground marking applied thereto by an idle trunk circuit. Relays such as 25 and 26 remain in an operated condition so that ground is not applied to the sleeve terminal of the switch in the eleventh step or overflow position.

When the switch is stepped into an overflow position the various overflow contacts marked with the letters "OF" are operated. So, it is seen that there is an absence of ground on sleeve conductor S5 and that overflow contacts OF41 close and OF42 open. Sleeve conductor S5 is connected through contacts 415, 432, overflow contacts OF41 and the winding of reversing relay 400 to (−) battery. However, since there is no marking on conductor S5 because all-trunks-busy relay 25 is operated, reversing relay 400 does not operate.

A circuit is completed for operating primary delay relay 440. This circuit may be traced from master ground through contacts 431, overflow contacts OF44 (which were operated when the switch stepped into the extremity of its switch motion thus indicating overflow), operated secondary off-normal contacts SON51 and the upper winding of primary delay relay 440 to (−) battery. Contacts 441 close and a circuit is completed for returning supervision to incoming selector 21. This circuit may be traced from ground (+), through contacts 431, operated overflow contacts OF44, operated contacts 441, low resistor R42, rest contacts 418, conductor HS4, conductor HS3, the lower winding of helping sleeve relay 330, operated contacts 219, conductor HS2, operated contacts 623, 752, and the lower winding of flash relays 650 and 640 to (−) battery. Relay 640 is marginal so that it will operate when energized in series with low resistance R42, but not when energized in series with high resistance R41.

Helping sleeve relay 330 operates its "X" or preliminary contacts 331 thereby completing a circuit from (−) battery, through its upper winding, contacts 331, conductor S2, contacts 216, sleeve conductors S3 and S4 to ground (+) at contacts 434. Helping sleeve relay 330 is now operated and locked depending upon the continuation of ground (+) extended from second selector 22 over conductors S4 and S3. Contacts 332 close thereby shunting the lower winding of relay 330 from the circuit including conductors HS3 and HS2 thus eliminating this amount of resistance from the marking ground (+). It should be noted that this is after preliminary or "X" contacts 331 have operated so that there is no danger of relay 330 releasing itself before it locks. Contacts 333 close to extend a ground (+) marking over contacts 211*a*, conductor LM2, trunk circuit 20 and the upper winding of flash relay 700 to (−) battery. Contacts 334 open to remove any level marking which may have been extended from wiring L through brush and wipers X to conductor LM2. This marking may have been useful while selector 21 was operating.

Relay 640 operates but 650 does not operate due to their marginal characteristics and to the value of resistor R42. Relay 640 locks from (−) battery, through its upper windings, "X" or preliminary contacts 643, master ground conductor MG and operated contacts 627 to ground (+). Contacts 641 open. This breaks the loop extended back to the selectors by way of conductor R2. This causes incoming selector 21 and second selector 22 to be released and made available for another call. Contacts 643 are "X" or preliminary so that it is certain that relay 640 will be locked operated before it releases the selectors to break its original operating circuit.

Trunk circuit 20 operates to transmit a signal to the operator at position 10 for indicating that all trunks to which selector 22 has access are busy but that there are idle trunks in this office accessible to other selectors which she might use. Relay 700 restores if it is operated when the circuit connection including conductor LM2 is broken due to the release of incoming selector 21. With relay 640 operated and 650 released, a circuit is completed from the 120 i.p.m. and tone conductor to the operator. This circuit may be traced through rest contacts 728, operated contacts 644, rest contacts 653 and the lower winding of flash relay 700 to (−) battery. Relay 700 is alternately operated and released at the rate of 120 impulses per minute. Each time that flash relay 700 operates, contacts 703 close to extend (−) battery through lamp L71, operated contacts 703, 647 and conductor M to signal circuit 600. Each time that flash relay 700 releases responsive to the 120 i.p.m. pulses, contacts 704 close to extend a connection from ground (+) through rest contacts 734, 704, 647 and conductor M to distant office #1.

The operator at position 10 observes the rate of flash and realizes that she must dial once more in an effort to get the idle trunk which is available in the office. If the call had originated at subscriber station 9, which is provided with automatic toll ticketing equipment, he would hear a special busy tone at this time. This tone may be traced from the 120 i.p.m. and tone conductor, through rest contacts 728, 644, 653, capacitor C62, operated contacts 645, contacts 625, contacts 754 and conductor R6 to the distant office. The operator disconnects momentarily to release the flashing relays and then reinitiates the call in the manner described above.

*All-trunks-busy.*—The next call to be described is one where all trunks in the local office are busy. For example, all trunks are busy both in group I and group II. In this case, the last ground (+) marking is removed from the all-trunks-busy conductor ATB (Fig. 1), thus causing relays, such as relays 25 and 26, to release. This connects at contacts 25*a* a ground (+) marking to sleeve conductor S5 when the switch is stepped into the eleventh or overflow position at the extremity of either its primary or secondary direction. The difference between this call and the one which was just described is that in the preceding call there was no ground on conductor S5, otherwise the circuit is substantially the same. This ground marking extends over conductor S5 and through contacts 415, 432, operated overflow contacts OF41 and the winding of reversing relay 400 to (−) battery. Relay 400 operates to reverse the direction of battery flow over conductors T4 and R4 at contacts 401—404. That is, before the operation of this relay the direction of battery flow may be traced from the lower winding of calling bridge relay 420 through operated contacts 404 and rest contacts 413 to conductor R4. Ground (+) may be traced through the upper winding of calling bridge relay 420, contacts 402, rest contacts 411 and conductor T4. After relay 400 operates and reverses the direction of battery flow, a circuit may be traced for operating the differential supervisory relay in trunk circuit 20. This circuit may be traced from (−) battery, through the lower winding of calling bridge relay 420, now operated contacts 401, rest contacts 411, conductors T4 and T3, operated contacts 212, conductor T2, operated contacts 622, upper winding RET61 of the retard coil, operated contacts 634, the winding of differential supervisory relay 710, operated contacts 636, lower winding RET62 of the retard coil, contacts 625, 641, 611, conductor R2, operated contacts 214, conductor R3, conductor R4, rest contacts 413, operated contacts 403 and the upper winding of calling bridge relay 420 to ground (+). Supervisory relay 710 operates in this circuit and closes contacts 711*a* to operate supervisory assist relay 720 over an obvious circuit. Relay 720 operates and closes contacts 727 while opening contacts 728. This switches from the 120 i.p.m. and tone conductor to the 30 i.p.m. conductor.

Meanwhile, returning to second selector 22 a circuit is completed from master ground applied at contacts 431, through operated overflow contacts OF44, operated contacts 441, low resistor R42, rest contacts 418, conductor HS4, conductor HS3, the lower winding of helping sleeve relay 330, operated contacts 219, conductor HS2, operated contacts 623, rest contacts 752, and the lower windings of flash relays 650 and 640 to (−) battery. Again, flash relay 650 is a marginal relay which will not operate when energized in series with the low resistance of resistor R42. Helping sleeve relay 330 operates in the circuit just traced. It closes its contacts 331 which are "X" or preliminary and thereby locks to ground on sleeve conductor S2. Contacts 332 close to shunt the lower winding of helping sleeve relay 330, thus eliminating its resistance from conductor HS3. Flash relay 640 operates. Flash relay 650 does not operate. A circuit may now be traced from the 30 i.p.m. conductor, through operated contacts 727, 644, rest contacts 653 and the lower winding of flash relay 700 to (−) battery. Relay 700 operates at the rate of 30 impulses per minute. This opens and closes contacts 703 and 704 alternately at the 30 i.p.m. rate, thus switching conductor M from (−) battery extended through the filament of lamp L71 to ground (+) extended through contacts 704, 712, 734. The operator at position 10 observes a lamp (not shown) flashing at the rate of 30 i.p.m. She disconnects knowing that all trunk circuits from the local office to distant office #2 are busy. It would be futile to try again at the present.

If the call were from a subscriber at station 9, provided with toll ticketing facilities, he does not hear the tone which was superimposed upon the 120 i.p.m. conductor and connected through capacitor C62 to ring conductor R6. Thus, he knows that he should not dial again.

*Level marking.*—In the fourth condition to be described, second selector 22 encounters a level marking which indicates that some special circuit feature is required. This marking extends from conductor L2 through wiper X1, operated contacts 411*a*, high resistance R41, conductors HS4, HS3, the lower winding of helping sleeve relay 330, operated contacts 219, conductor HS2, rest contacts 623, contacts 752, and the lower winding of flash relays 640 and 650 to (−) battery. Once again, helping sleeve relay 330 operates and closes preliminary or "X" contacts 331 to lock to sleeve conductor S2. It also closes its contacts 332 thereby shunting its lower winding. However, here the similarity between this and the preceding two calls is terminated because the resistance of resistor R41 is extremely high when compared to resistor R42. For example, resistor R41 may be four or five times the value of the resistance of R42. In this case, neither of the relays 640 nor 650 operate.

Helping sleeve relay 330 operates and closes its contacts 333 thereby applying a direct ground (+) marking over contacts 211*a*, conductor LM2 and the upper winding of flash relay 700. It may be recalled that this same marking was extended over conductor LM2 in the case of the two preceding calls. However, here the circuit function is different because in the two preceding calls relay 640 operated to open its contacts 641 and thereby release selectors 21 and 22. This in turn opened conductor LM2 at contacts 211*a* to release relay 700. This time contacts 641 do not open and the selectors do not release; therefore, flash relay 700 continues to be held over conductor LM2. Contacts 701 close.

This drawing shows that contacts 701 remove resistance R74 from the loop circuit which is connected in series with supervisory relay 710. For example, it is possible that connector 22*a* (Fig. 1) is special or different type switching equipment which requires a loop resistance which is different from that required by selectors 21 and 22. This is merely an illustration exemplifying what might happen. It seems obvious that contacts 701 could also insert a pad in the talking conductors, provide for frequency ringing, or perform any other function which may be necessary according to the needs of the circuit which is connected with the terminal that is marked by wiring L2.

Contacts 702 close to connect sleeve conductor S2 to ground (+). This is to hold selector 21, hence, to maintain ground on conductor LM2. The sleeve marking circuit may be traced from conductor S2, through operated contacts 702, 626, and rest contacts 642 to ground (+). Contacts 704 have no effect at this time because contacts 647 are now open because relay 640 will not operate in series with resistor R41.

*Flash recall.*—In the event that second selector 22 finds idle equipment, it is possible that flash supervision may be returned over that idle equipment. For example, a flash recall signal may be desired if the called subscriber jiggles his hookswitch to signal the operator. In this event, switchthrough relays 410 and 210 are operated to extend a direct connection from conductor HS5 to the lower windings of flash relays 640 and 650. This circuit may be traced from conductor HS5, through operated contacts 419, conductors HS4, HS3, the lower winding of helping sleeve relay 330, contacts 219, conductor HS2, operated contacts 623, 752 and the lower windings of flash relays 650 and 640 to (−) battery. Helping sleeve relay 330 operates and shunts its lower winding at contacts 332. In this case, there is no resistance in series with the HS conductors and both of the marginal flash relays 640 and 650 operate. It might be recalled that relay 650 does not operate in series with either of the resistors R42 or R41. With both of these flash relays operated, a circuit is completed from the 60 i.p.m. conductor through contacts 646, 652, and the lower winding of flash relay 700 to (−) battery.

Relay 700 responds by flashing at a rate of 60 impulses per minute. It opens and closes contacts 703 and 704 to switch conductor M alternately from ground (+) to (−) battery thus signaling recall to the operator at position 10 at the rate of 60 impulses per minute.

*Operator response.*—The operator at position 10 may take any action according to the type of supervision that she receives. For example, if the called line is idle she may proceed to dial the remaining number required to set either connector 22*a* or switching equipment in distant office #2 depending upon the destination of the call that is being completed. Or, if she receives a busy signal she will take appropriate action either by calling again or by waiting and placing a new call at some later time, as required.

*Release.*—When the selector is switched through, contacts 211 and 213 are opened thereby releasing calling bridge relay 220. This causes contacts 222 to open and restore release delay relay 230. Responsive thereto, contacts 231 and 235 open to remove ground (+) markings to which various other relays may be locked.

When the call is released after conversation, ground (+) is removed by means which is not shown from the various sleeve conductors marked by an S. The only relay in the selector circuit which is then operated is switched through relay 210. It releases. It had been locked operated through contacts 217 and sleeve conductor S2. Incoming selector 21 and second selector 22 are returned to their idle condition and are ready for the next call.

Supervisory relay 710 restores when switchthrough relay 210 releases to open contacts 212 and 214. This causes contacts 711 to open and 712 to close thereby returning on-hook supervision to the operator position 10. That is, ground (+) extended through contacts 734 replaces (−) battery extended through the filament of lamp L71. Signal circuit 600 is adapted to use this ground marking to extend supervision to the operator at position 10.

The operator at position 10 responds by releasing the circuit. This removes ground from conductor E. This ground had been extended over contacts 745 to the winding of pulse relay 610, which now releases. Contacts 612 open to release incoming delay relay 620. Contacts 622 and 625 restore calling bridge relay 220 in incoming selector 21, if it should then be operated. Contacts 627 open to remove the master ground marking which may have been holding any of the relays 630, 640, 650 or 720 operated. Also, it breaks the circuit for energization of the lower winding of supervisory relay 710 thus causing any of these relays that may have been operated to release. The circuit is now returned to normal and ready for the next call.

*Outgoing calls*

The next call to be described is one which is outgoing from selector 31. This call may be extended from operator 28 (Fig. 1) through out-dial trunk circuit 27 and outgoing selector 31 to two-way trunk circuit 20. This call may be destined for a subscriber in distant office #1 who is reached by way of trunk circuit 11 and automatic switching equipment 12. Outgoing selector 31 is also shown near the upper righthand portion of Fig. 6.

*Seizure.*—When outgoing selector 31 seizes trunk circuit 20, it operates calling bridge relay 730 over the following circuit: ground (+), through resistor R73, the upper winding of calling bridge relay 730, rest contacts 633, upper winding RET61 of the retard coil, rest contacts 621 and 721, conductor T7, through a suitable D.C. loop completed at the calling operator's position and return through outgoing selector 31, conductor R7, rest contacts 723, 624, lower winding RET62 of the retard coil, rest contacts 635 and the lower winding of calling bridge relay 730 to (−) battery. Calling bridge relay 730 is provided to seize trunk circuit 20, to respond to and to repeat digit pulses. Contacts 733 close while contacts 734 open thus switching conductor M from ground (+) to resistance battery. The battery marking is extended through the filaments of lamp L71, operated contacts 703, rest contacts 647, and conductor M to signal circuit 600 where suitable equipment transmits a seizure signal to distant office #1. Contacts 731 close to operate release delay relay 740.

The purpose of relay 740 is to hold certain equipment throughout digit pulsing and to control the release of the switch. Contacts 741 close to prepare a circuit for shunt relay 750; however, it does not operate until digit pulses are received. Contacts 742 close to operate flash relay 650 over an obvious circuit. Contacts 744 close to prepare a circuit for operating supervisory assist relay 720 over conductor E.

Flash relay 650 operates as a slave of relay 740. It closes its contacts 654 to connect ground (+) to conductor S7. This marks trunk circuit 20 as busy to other selectors and returns ground (+) to hold selector 31 operated.

Distant office #1 has been seized and automatic switching equipment 12 has been connected to be controlled from trunk circuit 20. Everything is now in readiness for the calling operator at position 28 to transmit a suitable series of digit pulse trains.

*Outgoing pulsing.*—Each digit pulse is in the form of an open loop or break in the D.C. loop extended across conductors T7 and R7. Responsive to each break in the loop, calling bridge relay 730 restores to transmit one digit pulse. These digit pulses are transmitted over conductor M in the form of ground pulses. That is, during the call conductor M normally is marked by (−) battery extended through the resistance of lamp L71 and contacts 703. During each digit pulse that is repeated by relay 730, contacts 734 close to extend a pulse of ground potential current over conductor M. Contacts 732 close on the first digit pulse to operate shunt relay 750 over a circuit including contacts 741.

Assume that the upper winding of calling bridge relay 730 is directly connected to positive ground. When the afore-mentioned D.C. loop extended across conductors T7 and R7 is initially broken to de-energize CB relay 730, the collapsing flux previously developed in the saturated calling bridge relay 730 produces a considerable voltage across retard coils 61 and 62 due to the resulting inductive "kick" which in turn might cause a spurious noise pulse to be transmitted by conductors T6 and R6 to distant office #1. This undesirable effect is partially eliminated by reducing the current flow through calling bridge relay 730 before the loop is initially broken, via the insertion of resistor R73 between the upper winding of the relay and positive ground. As a result, the afore-mentioned inductive "kick" will be considerably reduced since the amount of flux built up in the calling bridge relay windings is now considerably reduced. Upon receipt of the first pulse, slow to release shunt relay 750 is energized through contacts 732 and 741. This action shunts resistor R73 which is no longer needed because contacts 753 and 754 are opened for the remainder of the pulse train to disconnect the voice circuit which includes conductors T6 and R6 from the trunk circut 20, and thus noise is not transmitted through these conductors to distant office #1. In addition, the intervals between succeeding pulses are short enough so that the increased current flow during these intervals through the calling bridge relay 730 caused by the shunting of resistor R73 is compensated for by the fact that the core of calling bridge relay 730 does not have enough time between pulses to reach saturation.

The energization of shunt relay 750 causes contacts 755 to close to connect capacitor C72 and resistor R72 in parallel with the retard coils to offset the inductive effect and reduce the "kick" during operation of the CB relay 730.

As each digit pulse is received from operator position 28, calling bridge relay 730 follows to open and close its contacts 731 and 732. Both shunt relay 750 and release delay relay 740 receive a pulse of energizing current on each digit pulse. Neither releases during the interim because of their slow release characteristics. After the last digit pulse is received, shunt relay 750 restores. The shunt across the retard coil is broken when contacts 755 open. The talking conductors are returned to their conversation connection when contacts 753 and 754 close.

Answer supervision is received from distant office #1 when the called subscriber answers. The equipment in distant office #1 functions to transmit a suitable marking to signal circuit 600 over dial leg 601. Equipment not shown in signal circuit 600 then functions to apply a ground (+) marking to conductor E. Supervisory assist relay 720 operates over an obvious circuit which includes contacts 744. Relay 720 operates its contacts 721—724 to return answer supervision over conductors T7 and R7 by reversing the direction of battery flow. Contacts 725 open to remove the idle line termination which includes capacitor C71 and resistor R71. This idle line termination is normally provided across conductors T6 and R6 to prevent the toll line from becoming noisy which would happen if an unbalanced condition were allowed to exist.

Conversation is carried on following which the circuits may be released. If the called subscriber is the first to release, suitable equipment returns a signal over dial leg 601 and signal circuit 600 functions to remove the ground (+) markings connected to conductor E. This releases supervisory assist relay 720 which was holding over a circuit including contacts 744. Responsive thereto, contacts 721—724 are returned to normal to give an on-hook supervision to the operator at position 28. She responds by taking down the connection. This breaks the loop circuit extended through the winding of calling bridge relay 730 which restores. Responsive thereto, contacts 731 open to restore release delay realy 740. Contacts 733 and 734 return to normal so that conductor M is returned to a ground (+) marking. Contacts 742 open thereby restoring flash relay 650. Contacts 654 open to remove the busy marking from sleeve S7 thereby marking trunk circuit 20 idle to other calls. The circuit is now returned to normal and ready for the next call.

If the calling operator disconnects first, calling bridge relay 730 releases first. Then, on-hook supervision is returned to distant office #1 by contact 734.

It should be understood that the foregoing description has been by way of example only. We intend to include within the scope of the attached claims not only the embodiment shown and described, but also all modifications that may fall within the true spirit of our invention.

What is claimed is:

1. In a telephone system, a two-way trunk circuit, automatic switching means, said two-way trunk circuit having access to said switching means, means for forwarding calls comprising other equipment accessible to said automatic switching means, said other equipment being divided into groups according to its relation with said automatic switching means, means for extending calls through said two-way trunk circuit and said automatic switching means to said other equipment, means effective if all of said other equipment is busy for returning a first supervisory signal through said automatic switching means to said trunk circuit, and means effective if all of said other equipment in one of said groups is busy but at least some of said other equipment in another of said groups is idle for returning a second supervisory signal through said automatic switching means to said two-way trunk circuit.

2. The telephone system of claim 1 and means for further extending calls from said other equipment if it is idle to more distant equipment, and means for returning still other supervisory signals from said distant equipment through said other equipment and said automatic switching means to said two-way trunk circuit.

3. The telephone system of claim 1 and a calling operator position, a trunk line interconnecting said position and said trunk circuit, and means in said trunk circuit for sending distinctive signals over said trunk line depending upon which of said supervisory signals is received.

4. The telephone system of claim 1 wherein said switching means comprises step-by-step equipment, means for driving said step-by-step equipment to any of a plurality of levels, means for distinctively marking certain of said levels, means for extending a third signal through said automatic switching means to said two-way trunk circuit on certain predetermined ones of the said levels, responsing to said marking means.

5. The telephone system of claim 4 and calling means for extending calls to said two-way trunk circuit, means in said two-way trunk circuit for transmitting distinctive signals to said calling means depending upon which of said supervisory signals is received, and means in said two-way trunk circuit for performing unique circuit operations responsive to the receipt of said third signal.

6. The system of claim 1 wherein said automatic switching means comprises a selector, and said means for returning said first supervisory signal comprises circuit means completely responsive to an overflow condition of said selector and a distinctive marking connected into said circuit means.

7. The telephone system of claim 6 wherein said means for returning said second supervisory signal comprises a different marking connected into said circuit means responsive to an overflow condition in said selector.

8. The telephone system of claim 7 wherein said automatic switching means is connected to said two-way trunk circuit by way of at least one control conductor, and means for returning at least part of said supervisory signals over said control conductor.

9. The telephone system of claim 8 and means for reversing talking battery in said selector, means responsive to said distinctive marking only for operating said battery reversing means, means responsive to said operation of said battery reversing means for returning reverse battery supervision to said two-way trunk circuit and said means for returning said supervisory signals over said control conductor comprises means for applying a given potential to said conductor.

10. A telephone system comprising a first trunk circuit and at least one selector, said selector having four incoming conductors and four brushes, means for connecting said first trunk circuit and said selector via said incoming conductors, means for transmitting a plurality of supervisory signals over one of said incoming conductors, said last-named means comprising a source of marking potential, a plurality of individual marginal relays, means for selectively coupling either a first impedance, a second lower impedance or a third still lower impedance between said source of marking potential and said plurality of individual marginal relays to control the states of said marginal relays, and means for selectively returning distinctive busy signals from said first trunk circuit depending upon the states of said marginal relays.

11. The telephone system of claim 10 and means for applying said source of marking potential to a terminal of one of said impedances responsive to level markings, means for applying said source of marking potential to a terminal of another of said impedances responsive to an overflow condition of said selector, a talking loop comprising two of said incoming conductors, and means responsive to a marking applied to one of said brushes in said overflow position for selectively reversing the direction of battery flow in said talking loop.

12. The telephone system of claim 10 and another selector connected by said incoming conductors between said first trunk circuit and said named selector, another relay in said other selector having a winding connected in series with one of said incoming conductors, means for operating said other relay responsive to the application of said source of marking potential, means for locking said other relay in an operated position, and means for removing the impedance of the winding of said other relay from said one of said incoming conductors after said other relay is locked.

13. The telephone system of claim 10 and a plurality of other trunk circuits accessible to said four brushes, means for extending an all-trunks-busy conductor through each of said other trunk circuits, means for applying and removing markings to and from said all-trunks-busy conductor selectively responsive to the idle or busy condition of each of said other trunk circuits, mean responsive to an all-trunks-busy condition as indicated by the markings applied to said all-trunks-busy conductor relay for extending said reverse battery over said talking loop.

14. The telephone system of claim 10 and a calling bridge relay means in said first trunk circuit for transmitting digit pulse signals, said calling bridge relay having two windings, means for extending talking battery through said windings, and means for lowering the resistance of said means for extending said talking battery responsive to the receipt of a first digit pulse.

15. The telephone system of claim 10 and means in said first trunk circuit for compensating for inductance in said talking circuit whereby said digit pulses are of uniform characteristics.

References Cited in the file of this patent

UNITED STATES PATENTS

| | | |
|---|---|---|
| 1,613,624 | Stokely | Jan. 11, 1927 |
| 2,083,404 | Saul | June 8, 1937 |
| 2,310,481 | Wallace | Feb. 9, 1943 |
| 2,685,617 | Kessler | Aug. 3, 1954 |
| 2,702,832 | Pharis | Feb. 22, 1955 |
| 2,704,787 | Pharis | Mar. 22, 1955 |
| 2,707,727 | Pharis | May 3, 1955 |
| 2,715,658 | Dunlap et al. | Aug. 16, 1955 |
| 2,725,427 | Murray | Nov. 29, 1955 |
| 2,744,963 | Pharis | May 8, 1956 |
| 2,792,451 | Pharis et al. | May 14, 1957 |
| 2,796,466 | Molnar | June 18, 1957 |